United States Patent [19]

Schneider

[11] Patent Number: 4,485,288
[45] Date of Patent: Nov. 27, 1984

[54] WIRE GUIDING DEVICE FOR ELECTROEROSION FINISHING MACHINES

[75] Inventor: Rudolf Schneider, Reinach, Switzerland

[73] Assignee: Erowa AG, Reinach, Switzerland

[21] Appl. No.: 437,943

[22] Filed: Nov. 1, 1982

[30] Foreign Application Priority Data

Jan. 4, 1982 [CH] Switzerland .............................. 6/82

[51] Int. Cl.³ .............................................. B23P 1/08
[52] U.S. Cl. ................................ 219/69 W; 219/69 E; 219/69 R
[58] Field of Search ................ 219/69 W, 69 E, 69 R, 219/68, 69 G

[56] References Cited

U.S. PATENT DOCUMENTS

| | | | |
|---|---|---|---|
| 4,123,645 | 10/1978 | Shichida et al. ................. | 219/69 W |
| 4,333,806 | 6/1982 | Inoue ................................. | 219/69 W |
| 4,353,785 | 10/1982 | Inoue ................................. | 219/69 W |

Primary Examiner—M. H. Paschall
Attorney, Agent, or Firm—Yount & Tarolli

[57] ABSTRACT

In swinging wire guides for generally conical finishing surfaces, the problem exists of a reliable automatic coaxial setting of the guide axes according to the particular angular position of the wire electrode in the workpiece finishing zone.

As a solution, the wire guides (DF1, DF2) supported swinging on the support elements (TO1, TO2) are joined together by a coupling device, which has a guide member (FG) joined correspondingly with the support elements. The latter is set by the relative movement of the wire guides (DF1, DF2) to the desired angular position of the wire guides according to the ideal wire guide axis (D—D). Through swinging coupling gears (SK1, SK2) the angle position of the guide member (FG) is transmitted to the wire guides (DF1, DF2). These coupling gears suitably contain a jointed parallelogram (LK) and a rotary coupling member (DK) for the transmission of two swinging movement components, perpendicular to each other, in the sense of a total biaxial forced coupling of the guide member with the wire guides.

12 Claims, 2 Drawing Figures

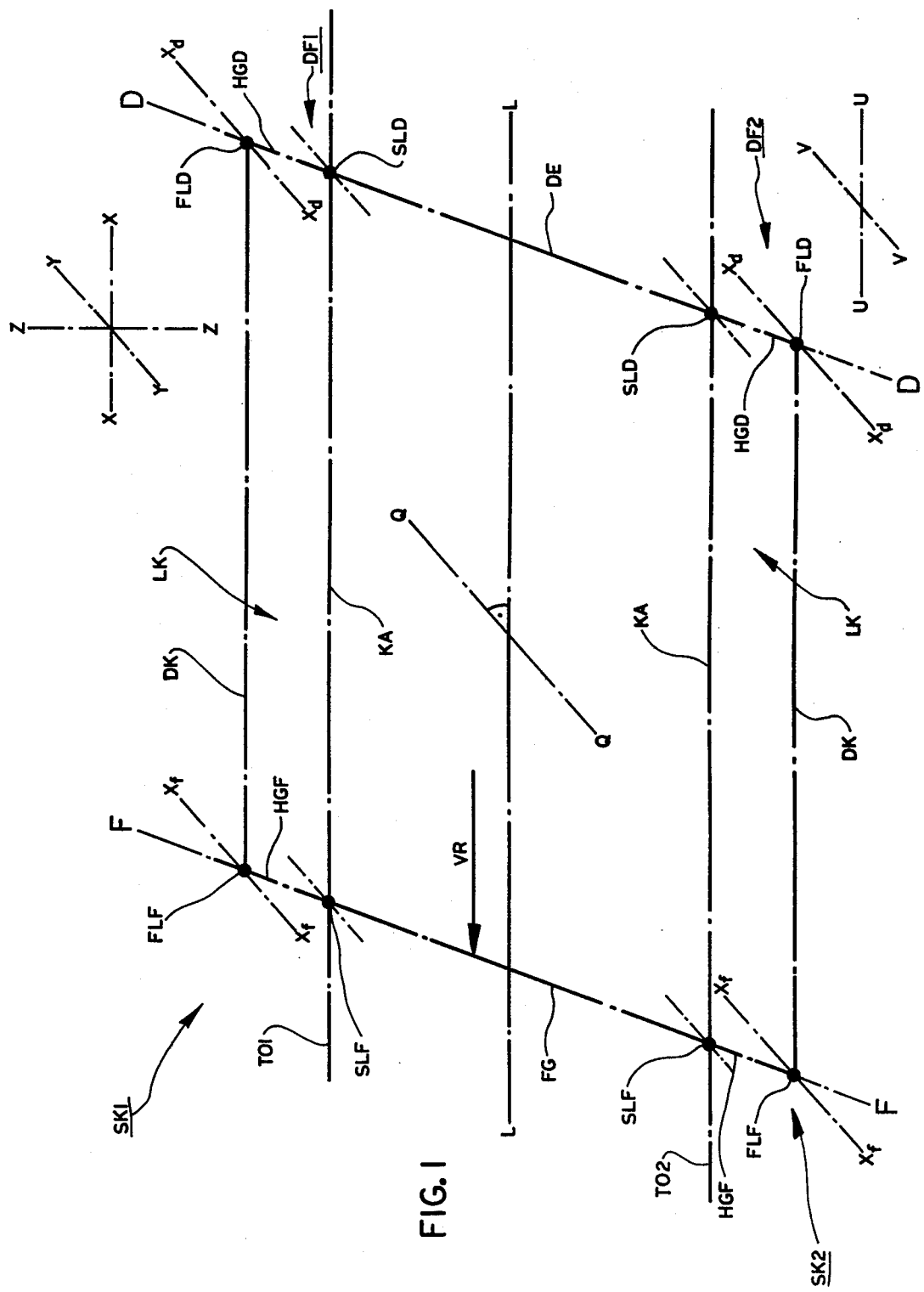

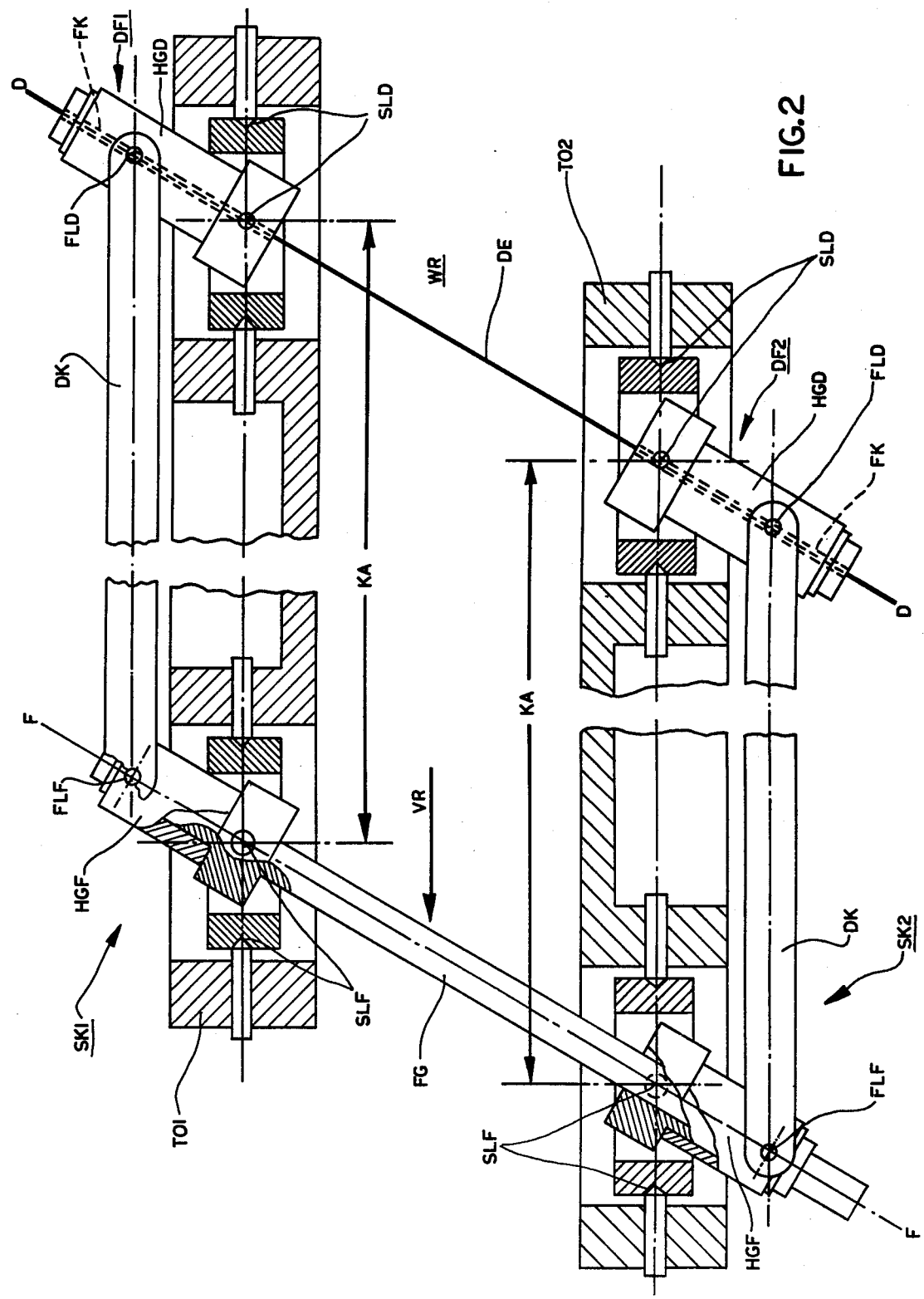

WIRE GUIDING DEVICE FOR ELECTROEROSION FINISHING MACHINES

The invention relates to a wire guiding device for electroerosion finishing machines, in which two wire guides are arranged movable in relation to each other on support elements, and are also pivotally supported on the support elements, especially to all sides, the wire guides being set, by means of a coupling device, with their guide axes aligned with each other. Wire erosion machines with such wire guiding devices make possible the production of generally cylindrical and conical workpiece forms in many variations and combinations.

A wire guiding device of the kind mentioned is known from the journal "Precision", Oct. 1981, p. 49–57, especially p. 51. According to this journal, it is proposed that two wire guides, lying opposite each other, be provided with independent Cardan universal movement drives, as well as a synchronizing coupling. Such a synchronous control of the wire guide angle setting is associated with considerable expense.

The problem of the invention, therefore, is the creation of a wire guiding device for electroerosion finishing machines, which is distinguished by simple construction, and which can be realized at relatively low cost, with satisfactory performance. The solution of this problem, according to the invention, in a wire guiding device of the kind mentioned, lies in the fact that the coupling device has a guide member pivotally joined with the support elements of the wire guides, of which the angle position is set by the relative movement of the wire guides in agreement with the angle position of the wire electrode extending between the wire guides, and that this guide member is connected through swinging coupling gears with the wire guides.

The guide member provided in this way according to the invention, which joins the wire guide support elements together, is set, with any relative movement of these support elements in relation to each other, whether lengthwise, crosswise or in height, according to the variable angular position of the line of connection between the wire guides and thus represents at any time the desired angle position for the axes of the two wire guides. This guide member can advantageously be designed very simply, for example as a cylindrical guide pin, and can be given great stiffness against deformation, so that in combination with the freedom of play directly attainable by the respective swinging bearing of the guide member on the support element, a high accuracy of setting is assured. This accuracy of setting is true also for the wire guides themselves, since the angular position of the guide member is transmitted directly through swinging coupling gears to the swingably supported wire guides.

For these swinging coupling gears, also, constructions of the usual kind, simple and designed to be slightly stiff against deformation, may be considered, so that, in all, a strong and reliable structure of the wire guiding device is given.

In an advantageous development of the invention, the guiding member is arranged, displaced in relation to the wire guides, outside the finishing space of the workpiece. Here, the distance of displacement is bridged over by the swinging coupling gear. In this way, a perfect angular setting of the wire guide can be obtained, even for long reaches of the support elements, without obstructing the free workpiece finishing space with the guide member and the coupling gear.

For a simple way of taking into account the change of the relative distance of the wire guides with relative movement therebetween, the guide member is designed to be telescopic, or connected movable lengthwise with at least one of the wire guide support elements. This makes possible, in a simple fashion, a relatively great adjusting stroke of the wire guides.

The swinging support of the guide member on the support elements is suitably designed in the same way as the swinging support of the wire guides themselves, for example, in the form of universal joints. In principle, however, a support swinging to all sides with the aid of ball joints may be used, with the advantage of greater simplicity.

The invention will be explained further from the example of execution shown in the drawings.

FIG. 1 shows a geometric principle scheme of a coupling device according to the invention for mutual relative movement to all sides of the wire guides, and FIG. 2 shows a longitudinal and vertical section, respectively, of a corresponding wire guiding device in a plane section through the axes of the wire guides and of the guide member.

Within the elongated support elements T01 and T02, shown in broken lines in FIG. 2, are supported wire guides DF1 and DF2 by means of Cardan swing bearings, swingable to all sides. Central guide channels FK of the wire guides are provided with guide rings of a hard material, not shown, and conduct the wire electrode DE through the workpiece finishing space WR. The support elements T01, T02, and thus the wire guides DF1, DF2 also, can be set and driven in relation to each other, in a manner which is known and therefore not shown, or independently of each other or even in common, in the direction of an advance movement in relation to the workpiece, according to the coordinate axes X—X, Y—Y, or U—U, V—V and also in the direction of the height axis Z—Z, shown in FIG. 1. The corresponding setting and drive means do not belong to the subject of the invention and are known from the art, so that detailed explanations thereof are omitted.

With this relative movement it is assured, in a manner known per se, through the machine-side guides of the support element, that the support elements remain fixed in angle, parallel to each other. Otherwise, the midpoints of the wire guide swinging bearings SLD can take any position in space in relation to each other, taking the ideal angle position according to the wire guide axis D—D. In FIG. 2, for example, only one relative displacement of the support elements is indicated, in the horizontal direction and parallel to the plane of the drawing. Corresponding conditions apply, naturally, to a relative movement in the direction of the vertical axis or transverse to the plane of the drawing.

For the desired coaxial forced setting of the wire guides DF1, DF2 according to a common wire guide axis D—D, there is provided, as shown in FIG. 2, a rod-form guide member FG, joining the two support elements, which is arranged in the arrow direction VR, horizontally displaced from the wire guides and the wire electrodes DE, and thus arranged outside the workpiece finishing space WR. The guide member FG is supported, swinging to all sides, in both support elements, by swinging bearings SLF, which correspond in their structure to the wire guide swinging bearing SLD. The guide member, as shown in FIG. 2, is also movably supported in relation to the swinging bearing SLF of the lower support element T02, in its lengthwise direction, that is, in the direction of the guide member axis F—F. With this, any relative movement of the support elements is taken into account while maintaining their parallel position.

As shown from FIG. 1, the coupling sections KA of the support elements T01 and T02 between the respective swinging bearings SLD and SLF of the wire guides and the guide member are dimensioned identically. The same applies to the effective length of the guide member between the swinging bearings SLF on the support elements T01 and T02, respectively, in relation to the distance between the wire guide swinging bearings SLD. Thus, there is given, geometrically, a jointed parallelogram, which always holds the guide member axis F—F parallel to the ideal wire guide axis D—D. The guide member embodies, therefore, with any relative position of the wire guides, at all times, the desired angle position of the wire guide axis D—D.

The transmission of this desired angle position to the wire guides takes place by means of swinging coupling gears SK1 and SK2, assigned to the two support elements. As to a swinging movement of the guide member around the lengthwise axis L—L, extending in the direction of the displacement VR, this swinging coupling takes place by means of the rotary coupling members DK shown in FIG. 2, which are designed rigid against torsion and forked at their ends, and are joined by guide bearings FLD and FLF with the wire guides and with the guide member, respectively. These guide bearings are designed as single-axis swinging bearings with swinging axes Xd and Xf, perpendicular to the plane of the parallelogram according to the axes D—D and F—F. Consequently, the swinging movement of the guide member around the axis L—L is transmitted exactly to the wire guides.

For a swinging coupling around the transversal axis Q—Q, directed perpendicular to the axis L—L, the swinging coupling gears SK1 and SK2 each form a parallelogram jointed gear LK (see FIG. 1). These jointed gears are formed geometrically of the following elements:

(a) a coupling section KA of the support element between the swinging bearings SLD, SLF of the wire guide DF1, on the one hand, and the guide member FG, on the other;

(b) a lever member HGD, extending parallel with the wire guide axis D—D from the swinging bearings SLD of the wire guide DF1 to a guide bearing arranged on the wire guide axis D—D, and joined, secured against swinging, with the wire guide 1;

(c) a lever member HGF, extending parallel to the lengthwise axis F—F of the guide member FG from the swinging bearing SLF of this guide member to a guide bearing FLF arranged on its lengthwise axis F—F, and joined, secured against swinging, with the guide member FG, which has a length corresponding to that of the wire guide lever member HGD; and (d) a coupling joint DK, joining together the guide bearings FLD, FLF of the wire guide lever member HGD and the guide member lever member HGF, which has a length corresponding to that of the coupling section KA of the support element T01, lying opposite.

With this, therefore, there is a biaxial and thus complete swinging coupling between guide member and wire guides, the rotary coupling member DK performing a double function—on the one hand, as to the swinging around L—L, as a torsion member, and on the other hand, as a coupling joint within the respective parallelogram joint gear LK. The lever members HGD and HGF, in the example, of FIG. 2, are designed as sockets rotatable in relation to the axes D—D and F—F, respectively, which is necessary because of the rotation rigidity of the universal joint around the veritcal axis, in the interests of swingability to all sides. This additional rotary bearing may be omitted with the use of ball joints.

I claim:

1. A wire guiding device for electroerosive finishing machines, in which two wire guides having longitudinally extending axes and having swinging bearings are arranged movable in relation to each other on respective support elements, and also supported swingable on the support elements, especially swingable to all sides, the wire guides being set by means of a coupling device with their guide axes aligned with each other, with the distinction that the coupling device has a guide member swingable with the support elements of the wire guides, of which the angular position is set through the relative displacement of the wire guides into agreement with the angular position of the wire electrode extending between the wire guides, and that this guide member is joined through swinging coupling gears with the wire guides, the guide member being arranged displaced in relation to the wire guides outside the finishing space of the workpiece, at least one of the swinging coupling gears having for a swinging coupling an axis at least approximately parallel to the direction of displacement of the guide member opposite the guide wires, and a rotary coupling member rigid against deformation, which is joined on the one hand with the guide member, and on the other with the respective wire guides, and wherein at least one of the swinging coupling gears has a parallelogram linking gear for the swinging coupling between the guide member and the wire guides around a transverse axis arranged at least approximately perpendicular to the direction of displacement of the guide member in relation to the wire guides.

2. A wire guiding device according to claim 1 with the distinction that the rotary coupling member is designed as a coupling link of the parallelogram linking gear.

3. A wire guiding device according to any one of claims 1 or 2, with the distinction that the parallelogram link gear of a swinging coupling gear is formed, in each case, of the following elements:

(a) a coupling section of the support element between the swinging bearings of the wire guide, on the one hand, and the guide member on the other;

(b) a lever member extending parallel to the wire guide axis from the swinging bearing of the wire guide to a guide bearing arranged on the wire guide axis, and joined, non-swinging, with the wire guide;

(c) a lever member extending parallel with the longitudinal axis of the guide member from the swinging bearing of this guide member to a guide bearing arranged on its longitudinal axis, and joined, non-swinging, with the guide member, which has a length corresponding to the length of the wire guide lever member;

(d) a coupling link, joining the guide bearings of the wire guide lever member and of the guide member lever member with each other, which has a length corresponding to the length of the coupling section of the support element, lying opposite.

4. A wire guiding device according to claim 3, with the distinction that the guide bearings of the wire guide and guide member lever member are designed as single-axis swinging bearings with joint axes arranged perpendicular to the plane of the parallelogram linking gear and secure against rotation in a direction transverse to their joint axes.

5. A wire guiding device according to claim 1, with the distinction that the guide member is designed telescopic or joined movable lengthwise with at least one of the wire guide support elements.

6. A wire guiding device according to claim 2, with the distinction that the guide member is designed telescopic or joined movable lengthwise with at least one of the wire guide support elements.

7. A wire guiding device according to claim 3, with the distinction that the guide member is designed telescopic or joined movable lengthwise with at least one of the wire guide support elements.

8. A wire guiding device according to claim 4, with the distinction that the guide member is designed telescopic or joined movable lengthwise with at least one of the wire guide support elements.

9. A wire electrode supporting and guiding device for an electro-erosive machining apparatus, comprising
first and second wire electrode guiding members having central axes adapted to receive a wire electrode extending therebetween;
first and second supporting elements for receiving and supporting said first and second guiding members, respectively, each of said first and second guiding members being pivotally mounted on one of said supporting elements, respectively, and being displaceable in relation to each other;
coupling means connected to said guiding members for maintaining an alignment of the central axes of said guiding members upon a displacement and/or a pivoting of said guiding members relative to each other;
said coupling means comprising a coupling bar member pivotally connected to said first and second supporting members, respectively, and to said first and second wire electrode guiding members, respectively, by means of swinging coupling gear members, the angular position of said coupling bar member thereby always corresponding to the angular position of said wire electrode extending between said first and second guiding members.

10. An apparatus according to claim 9, wherein at least one of said swinging coupling gear members comprises a torsionally rigid rotary coupling member, one end thereof being connected to said coupling bar member and the other end thereof being connected to the related wire electrode guiding member, said rotary coupling member being adapted to rigidly connect said coupling bar member to said wire electrode guiding member upon a pivotal movement of one of said coupling bar member and said wire electrode guiding member, respectively.

11. An apparatus according to claim 9, wherein at least one of said swinging coupling gear members comprises a parallelogram linking gear means adapted to couple said coupling bar member to said wire electrode guiding member upon a pivotal movement or upon a linear displacement of one of said coupling bar members and said wire electrode guiding member, respectively.

12. An apparatus according to claim 9, wherein at least one of said swinging coupling gear members comprises a parallelogram linking gear means comprising a torsionally rigid rotary coupling member, one end thereof being connected to said coupling bar member and the other end thereof being connected to the related wire electrode guiding member, said rotary coupling member being adapted to rigidly connect said coupling bar member to said wire electrode guiding member upon a pivotal movement of one of said coupling bar member and said wire electrode guiding member, respectively.

* * * * *